United States Patent
Suzuki

(10) Patent No.: US 8,133,307 B2
(45) Date of Patent: Mar. 13, 2012

(54) DEHUMIDIFICATION TYPE AIR SYSTEM

(75) Inventor: Toshihiro Suzuki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 419 days.

(21) Appl. No.: 12/523,870

(22) PCT Filed: Oct. 31, 2007

(86) PCT No.: PCT/JP2007/071217
§ 371 (c)(1),
(2), (4) Date: Jul. 21, 2009

(87) PCT Pub. No.: WO2008/093457
PCT Pub. Date: Aug. 7, 2008

(65) Prior Publication Data
US 2010/0077784 A1    Apr. 1, 2010

(30) Foreign Application Priority Data
Jan. 30, 2007  (JP) ................................. 2007-019707

(51) Int. Cl.
*B01D 53/22* (2006.01)
(52) U.S. Cl. ................. 96/4; 95/45; 95/52; 96/8; 96/10; 128/205.12
(58) Field of Classification Search .............. 96/4, 8, 96/10; 128/205.12; 95/45, 52
See application file for complete search history.

(56) References Cited

U.S. PATENT DOCUMENTS

| | | | | |
|---|---|---|---|---|
| 4,915,838 A * | 4/1990 | Bonne et al. | .................. | 210/640 |
| 4,985,055 A * | 1/1991 | Thorne et al. | ....................... | 96/6 |
| 5,118,327 A * | 6/1992 | Nelson et al. | ..................... | 95/10 |
| 5,501,212 A * | 3/1996 | Psaros | ....................... | 128/205.12 |
| 5,688,306 A * | 11/1997 | Verini | ............................... | 95/15 |
| 5,762,690 A * | 6/1998 | Hermann | ............................. | 96/4 |
| 5,885,329 A * | 3/1999 | Hermann | ............................ | 95/22 |
| 6,126,721 A * | 10/2000 | Nemser et al. | .................... | 95/54 |
| 6,296,683 B1 * | 10/2001 | Koch | ................................ | 95/23 |
| 6,746,513 B2 * | 6/2004 | Anderson | .......................... | 95/45 |
| 6,779,522 B2 * | 8/2004 | Smith et al. | ............... | 128/203.16 |
| 7,393,390 B2 * | 7/2008 | Matsunaga | ........................ | 96/10 |
| 2004/0074386 A1 * | 4/2004 | Nichols et al. | .................... | 95/52 |

(Continued)

FOREIGN PATENT DOCUMENTS

JP   63 54918   3/1988

(Continued)

OTHER PUBLICATIONS

Translation of Hideo et al. (JP 63-54918 A) Mar. 9, 1988.*

(Continued)

*Primary Examiner* — Jason M Greene
*Assistant Examiner* — Anthony Shumate
(74) *Attorney, Agent, or Firm* — Oblon, Spivak, McClelland, Maier & Neustadt, L.L.P.

(57) ABSTRACT

A dehumidification type air system is configured such that a switching valve and an air-used device are connected through a dehumidifying member made of a polymer permeation membrane with moisture permeability, and by bringing a moisture emitting face of the dehumidifying member into contact with the atmosphere, supply air supplied from the switching valve through the dehumidifying member to the air-used device is dehumidified by the dehumidifying member, while the moisture permeating through the dehumidifying member is diffused from the moisture emitting face to the atmosphere through natural evaporation.

8 Claims, 1 Drawing Sheet

U.S. PATENT DOCUMENTS

2010/0226823 A1\* 9/2010 Rakhman et al. ............... 422/84

FOREIGN PATENT DOCUMENTS

| JP | 63 54919 | 3/1988 |
| JP | 2001 300268 | 10/2001 |
| JP | 2002 320816 | 11/2002 |
| JP | 2007 29794 | 2/2007 |

OTHER PUBLICATIONS

Translation of Mitsuru et al. (JP 2001-300268 A) Oct. 30, 2001.\*
Translation of Kagawa et al. (JP 2002-320816 A) Nov. 5, 2002.\*
Translation of Maruo (JP 63-54919) Mar. 9, 1988.\*

\* cited by examiner

DEHUMIDIFICATION TYPE AIR SYSTEM

This application has priority to PCT/JP07/71217 and JP 2007-019707.

BACKGROUND OF THE INVENTION

1. Field of the Invention

The present invention relates to an air system configured to supply pressure air from a compressed air source to an air-used device through a switching valve and particularly to a dehumidification type air system provided with means for dehumidifying air.

2. Description of the Related Art

In the air system configured to drive the air-used device such as an air cylinder by the pressure air from the compressed air source, a switching valve is connected between the compressed air source and the air-used device, and the air from the compressed air source is supplied to the air-used device through this switching valve.

In this type of air systems, when the switching valve is switched and the air is outputted toward the air-used device, the air adiabatically expands in piping or the air-used device, which lowers its temperature and condenses moisture in the air into a mist. The mist gradually grows by repetition of air feed/discharge and results in harmful effects such as condensation to generate rust in the air-used device or interference with smooth operation of the air-used device due to loss of a lubricant.

Thus, the applicant proposes a dehumidifier device (dehumidification type condensation prevention device) using a polymer permeation membrane so as to dehumidify air outputted from the switching valve by the dehumidifier device and to supply the air in the dry air state to the air cylinder by connecting the dehumidifier device between the switching valve and the air cylinder.

The dehumidifier device is configured to accommodate two sets of hollow fiber membrane module sets side by side formed by arranging a large number of hollow fiber membranes side by side and to incorporate a plurality of three-way valves for controlling a flow-in air flowing into the air cylinder and a flow of flow-out air flowing out of the air cylinder, and the flow-in air outputted from the switching valve is dehumidified while traveling through each hollow fiber membrane in the hollow fiber membrane module set and supplied to the air cylinder as dry air, while the flow-out air flowing out of the cylinder is brought into contact with moisture that permeates through the surface of the hollow fiber membrane by dehumidification of the flow-in air and humidified while communicating through a flow passage formed on the outer side of the hollow fiber membrane and is discharged to the outside through the switching valve.

However, since the dehumidifier device accommodates the hollow fiber membranes inside its housing, the moisture having permeated through the surface of the hollow fiber membrane through dehumidification of the air needs to be forcedly emitted to the outside of the housing by purge air and thus, a flow passage for the purge air should be formed inside the housing or a three-way valve should be provided for controlling the flow of the purge air, by which structure is made complicated to some extent and large-sized as a whole, and that is not suitable for use in connection with a small-sized air cylinder.

Patent Document 1: Japanese Unexamined Patent Application Publication No. 2001-300268

BRIEF SUMMARY OF INVENTION

The present invention has an object to provide an air system provided with dehumidifying means which is simple in structure and compact without a need to forcedly diffuse moisture separated from air through dehumidification by purge air to the atmosphere.

In order to achieve the above object, in the air system of the present invention, a switching valve and an air-used device are connected to each other through a dehumidifying member made of a polymer permeation membrane with moisture selective permeability, and by bringing a moisture emitting face of the dehumidifying member into contact with the atmosphere so as to dehumidify by the dehumidifying member supply air supplied to the air-used device from the switching valve through the dehumidifying member, and the moisture separated by the dehumidifying member is diffused to the air by natural evaporation.

According to the present invention, since the moisture separated from the air by the dehumidifying member is diffused to the air from the moisture emitting face of the dehumidifying member through natural evaporation, there is no need to forcedly emit the moisture to the outside of the housing by feeding purge air as in the conventional device accommodating the dehumidifying member in the housing and thus, a flow passage for purge air or a three-way valve for controlling the flow of the purge air is not needed, and an air system provided with the dehumidifying means which is simple in structure and compact can be obtained.

In the present invention, preferably, the dehumidifying member is in a hollow state and has an air permeation hole inside and the moisture emitting face on its outer peripheral face, and a cylindrical connecting fixture is mounted on both ends of the dehumidifying member, respectively, and through this connecting fixture, the dehumidifying member is detachably connected between the switching valve and the air-used device.

In this case, the dehumidifying member is connected to a part of piping connecting the switching valve and the air-used device, the dehumidifying member is preferably disposed at a position closer to the air-used device side rather than an intermediate point of the piping and more preferably, a connecting fixture on one end of the dehumidifying member is directly connected to the air used-device, while the connecting fixture on the other end of the dehumidifying member is connected to the switching valve through a tube without moisture selective permeability.

In a preferred embodiment of the present invention, discharge air discharged from the air-used device is configured to be discharged from the switching valve to the outside through the dehumidifying member similarly to the supply.

The dehumidifying member may be covered by a protective cover with permeation. Also, the dehumidifying member may use the hollow fiber membrane.

Figure 1:
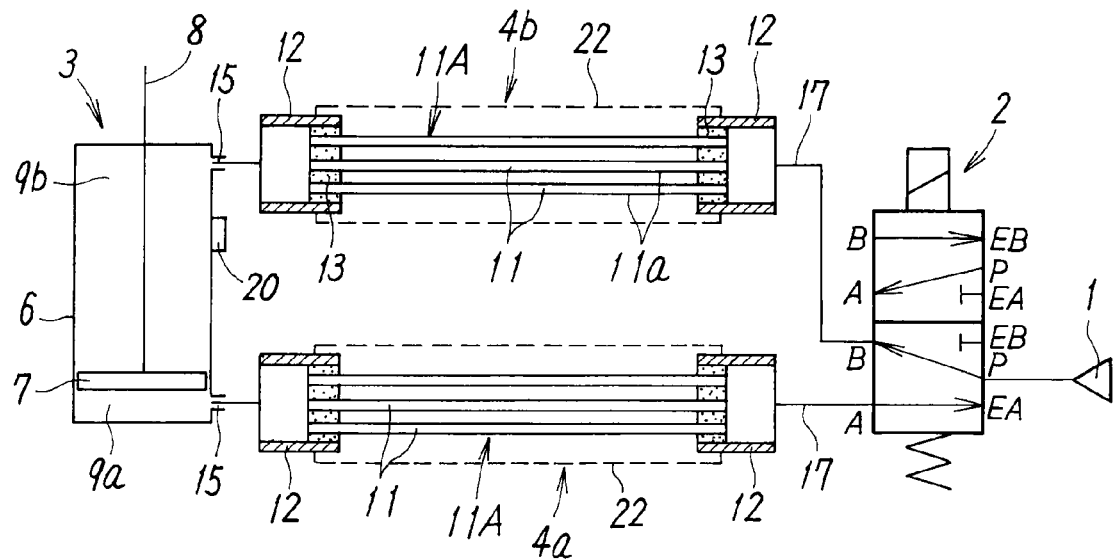
FIG. 1 is a block diagram of an air system according to the present invention.

REFERENCE NUMERALS 1 compressed air source
2 switching valve
3 air-used device
11 dehumidifying member
11a moisture emitting face
11A dehumidifying member bundle 12 connection fixture
17 tube
22 protective cover

DETAILED DESCRIPTION OF INVENTION

FIG. 1 schematically illustrates a dehumidification type air system according to an embodiment of the present invention using reference numerals. The air system is configured so that by supplying pressure air from a compressed air source 1 to an air-used device 3 through a switching valve 2, the pressure air drives the air-used device 3, and two dehumidifiers 4a, 4b using a polymer permeation membrane are connected between the switching valve 2 and the air-used device 3.

Since the air-used device 3 is represented by the air cylinder in the figure, the same reference numeral "3" as that of the air-used device is given to the air cylinder in the explanation below.

The air cylinder 3 has a piston 7 sliding inside a cylinder tube 6 and a rod 8 extending from the piston 7, and a pressure chamber 9a on the head side and a pressure chamber 9b on the rod side are formed on both sides of the piston 7.

The switching valve 2 is an electromagnetic operation type 5-port switching valve and has a supply port P, two output ports A, B, and two discharge ports EA, EB, and the compressed air source 1 is connected to the supply port P, while the dehumidifiers 4a, 4b are connected between the two output ports A, B and the two pressure chambers 9a, 9b of the air cylinder 3, respectively.

Figure 2:
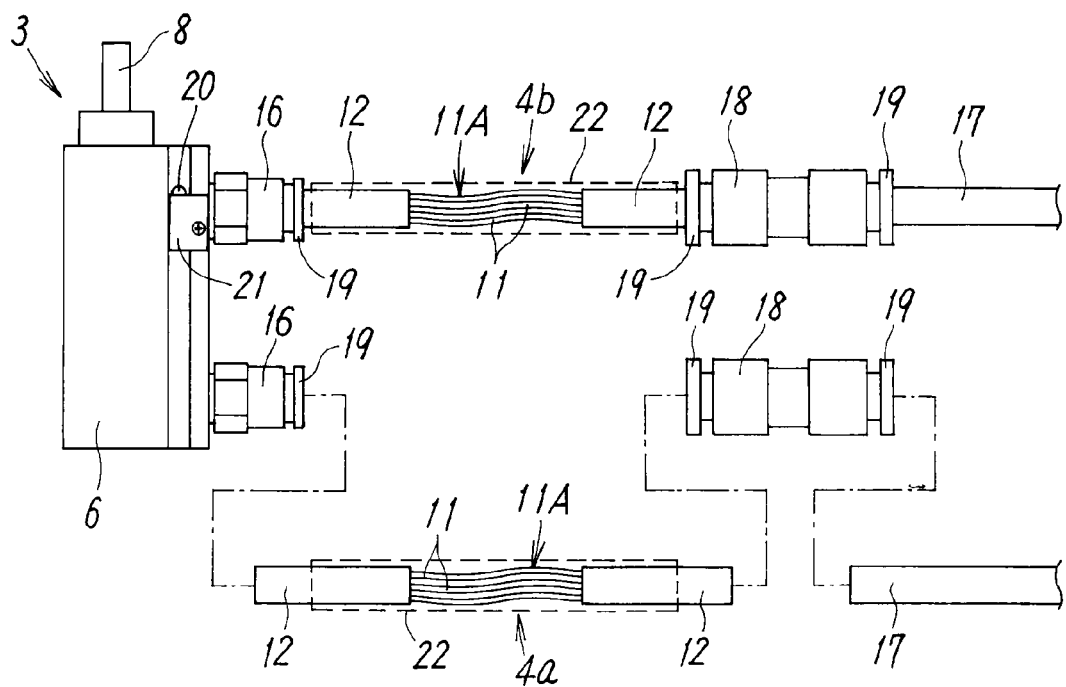
FIG. 2 is a side view of an essential part illustrating configuration of a connection portion between an air cylinder and a dehumidifier.

The dehumidifiers 4a, 4b have, as obvious from FIG. 2, dehumidifying members 11 in the hollow state formed by a polymer permeation membrane with moisture selective permeability, and pipe-shaped connection fixtures 12 also working as a support body are mounted on both ends of dehumidifying member bundles 11A made of a plurality of the humidifying members 11 disposed side by side, respectively, through potting materials 13 made by synthetic resin. Inside the humidifying member 11, an air through hole through which air communicates is formed, and the outer surface of the dehumidifying member 11 is made into a moisture emitting face 11a emitting moisture separated from the air and the moisture emitting face 11a is exposed to the outside and brought into direct contact with the atmosphere.

The connection fixture 12 on one end of the dehumidifying member bundle 11A is inserted into a pipe joint 16 mounted on the connection port 15 of the air cylinder 3 so as to be directly connected to the air cylinder 3, and the connection fixture 12 on the other end of the dehumidifying member bundle 11A is inserted into a pipe joint 18 mounted at the tip end of a normal tube 17 for connection, not having the moisture selective permeability, and by inserting and connecting the base end portion of the tube 17 to a pipe joint, not shown, mounted on the output ports A, B of the switching valve 2, the two dehumidifiers 4a, 4b are connected between the head-side pressure chamber 9a and the rod-side pressure chamber 9b as well as the two output ports A, B of the switching valve 2, respectively.

Therefore, the dehumidifying member 11 constitutes a part of piping connecting the switching valve 2 and the air-used device 3, and by directly connecting the connection fixtures 12, 12 on both ends of the dehumidifying member 11 to the air used device 3, all the piping is constituted by the dehumidifying member 11. If a part of the piping is constituted by the dehumidifying member 11, humidity in the piping shows a tendency to become higher at a portion closer to the air-used device 3 in general. Thus, in order to improve dehumidification effect, the dehumidifying member 11 is preferably disposed at a position closer to the air-used device 3 side rather than the intermediate point of the piping, or more preferably, the dehumidifying member 11 is disposed at the end portion on the air-used device 3 side of the piping. In this case, as mentioned above, one end of the dehumidifying member 11 is directly connected to the air-used device 3.

The two dehumidifiers 4a, 4b are formed separately and have the same configuration.

The polymer permeation membrane is a permeation membrane with moisture selective permeability which permeates moisture in the air, though the air is not permeated, and fluorine ion-exchange membrane or polyimide ion-exchange membrane is suitably used, for example. But it is needless to say that other membranes may be used.

The dehumidifying member 11 may be in any form as long as the member is in the hollow state and the air can communicate through the air through hole inside in a pressurized state, and a suitable example is a hollow fiber membrane machined into a hollow fiber (linear) state.

Each of the pipe joints 16, 18 is a simple-connection type pipe joint and is capable of connection in a retained state only by inserting the connection fixture 12 or the tube 17 into a connection port, and when the connected connection fixture 12 or the tube 17 is to be removed, a claw locked by the connection fixture 12 or the tube 17 is released by pushing in the pusher 19 for release. However, configuration of such a pipe joint is already known, and further explanation will be omitted.

Reference numeral 20 in the figure is a position sensor mounted on the cylinder tube 6 by a holder 21 for detecting an operating position of the piston 7 by detecting a permanent magnet mounted at the piston 7.

In the air system having the above configuration, FIG. 1 shows a state where the pressure air from the compressed air source 1 is supplied from the supply port P of the switching valve 2 through the second output port B and the second dehumidifier 4b to the rod-side pressure chamber 9b of the air cylinder 3, while the air in the head-side pressure chamber 9a of the air cylinder 3 is discharged from the first dehumidifier 4a through the first output port A and the first discharge port EA of the switching valve 2 to the atmosphere, by which the piston 7 is lowered (retreated) and the rod 8 is reduced.

In this switched state, the supply air supplied to the rod-side pressure chamber 9b is dehumidified while traveling through the air through hole in each of the dehumidifying members 11 in the second dehumidifier 4b and flows into the rod-side pressure chamber 9b as dry air. At this time, the moisture separated from the air and permeated into the moisture emitting face 11a on the outer periphery of the humidifying member 11 is diffused to the atmosphere by natural evaporation since the moisture emitting face 11a is in direct contact with the air.

The discharge air discharged from the head-side pressure chamber 9a communicates through each of the dehumidifying members 11 of the first dehumidifier 4a and is discharged to the atmosphere in the dry air state from the first output port A through the first discharge port EA of the switching valve 2.

When the switching valve 2 is switched from the switched state in FIG. 1 and the first output port A communicates with the supply port P and the second output port B communicates with the second discharge port EB, the pressure air from the compressed air source 1 is supplied to the head-side pressure chamber 9a of the air cylinder 3 through the first output port A and the first dehumidifier 4a, while the air in the rod-side pressure chamber 9b is discharged to the atmosphere from the second dehumidifier 4b through the second output port B and the second discharge port EB of the switching valve 2, by which the piston 7 is raised (advanced) and the rod 8 is extended. At this time, the supply air supplied to the head-side pressure chamber 9a is dehumidified through each of the dehumidifying members 11 of the first dehumidifier 4a and flows into the head-side pressure chamber 9a as dry air. The moisture separated from the air and permeated through the moisture emitting face 11a of the dehumidifying member 11 is diffused to the air by natural evaporation.

The discharge air discharged from the rod-side pressure chamber 9b communicates through each of the dehumidifying members 11 of the second dehumidifier 4b and is discharged from the switching valve 2 to the atmosphere in the dry air state.

Therefore, the moisture permeated through the surface of the dehumidifying member 11 by dehumidification of the supply air supplied to the air cylinder 3 does not have to be forcedly dispersed to the air by purge air, and a flow passage for flowing of the purge air or a three-way valve or the like for controlling the flow is not required, by which the dehumidifiers 4a, 4b can be configured simply and in a compact manner. Moreover, the discharge air discharged from the air cylinder 3 is discharged from the switching valve 2 in the dry air state through the dehumidifying member 11, and thus, there is no inconvenience that condensed moisture adheres to the switching valve 2 as in the case of discharge of air after humidification. On the contrary, even if the moisture in the supply air adheres to the switching valve 2 at supply of air, the moisture is removed by discharge air.

In the above embodiment, the moisture emitting face 11a of the dehumidifying member 11 in the dehumidifiers 4a, 4b are fully exposed to the outside to be in direct contact with the atmosphere, but by covering the moisture emitting face 11a, that is, the dehumidifying member 11 with the protective cover 22 with permeation, the moisture emitting face 11a may be brought into contact with the atmosphere through the protective cover 22. In this case, as shown by a dotted line in FIGS. 1 and 2, the protective cover 22 may be installed so as to surround the entire periphery of the dehumidifying member bundle 11A to be mounted on both the connection fixtures 12 or individually installed for each dehumidifying member 11. Depending on the case, instead of individual installation of the protective cover 22 on the two dehumidifiers 4a, 4b, the cover may be mounted so as to cover the two dehumidifiers 4a, 4b in a lump sum.

The protective cover 22 may be formed by a porous thin plate made of metal or synthetic resin. Also, the protective cover 22 may be hard but if the dehumidifiers 4a, 4b preferably have some flexibility, the cover which is semihard or has flexibility may be used.

In the above embodiment, the dehumidifiers 4a, 4b are provided with the plurality of dehumidifying members 11, respectively, but if an air flow-rate is small as in supply of air to a small-sized air-used device or when a sectional area of the air through hole inside the dehumidifying member 11 is large, for example, the number of dehumidifying members 11 may be one. Alternatively, depending on the use condition, the number of dehumidifying members 11, the size (sectional area) of the through hole or the like may be made different between the one dehumidifier 4a and the other dehumidifier 4b.

What is claimed is:

1. A dehumidification air system comprising a compressed air source supplying air to an air-used device through a switching valve, wherein
the switching valve and the air-used device are connected to each other through a dehumidifying member made of a polymer permeation membrane with moisture selective permeability, and by bringing a moisture emitting face of the dehumidifying member into contact with the atmosphere, the supply air supplied from the switching valve through the dehumidifying member to the air-used device is dehumidified by the dehumidifying member, and the moisture separated by the dehumidifying member is diffused to the atmosphere by natural evaporation, wherein
discharge air discharged from the air-used device is discharged from the switching valve to the outside through the same dehumidifying member as that at supply.

2. The air system according to claim 1, wherein the dehumidifying member is in a hollow state and has an air through hole inside and the moisture emitting face on an outer peripheral face, a cylindrical connection fixture is mounted at both ends of the dehumidifying member, respectively, and the dehumidifying member is detachably connected between the switching valve and the air-used device through the connection fixture.

3. The air system according to claim 2, wherein the dehumidifying member is connected to a part of piping connecting the switching valve and the air-used device, and the dehumidifying member is disposed at a position closer to the air-used device side rather than an intermediate point in the piping.

4. The air system according to claim 3, wherein the connection fixture on one end of the dehumidifying member is directly connected to the air-used device, while the connection fixture on the other end of the dehumidifying member is connected to the switching valve through a tube without the moisture selective permeability.

5. The air system according to claim 1, the dehumidifying member is covered by a protective cover with porosity.

6. The air system according to claim 2, the dehumidifying member is covered by a protective cover with porosity.

7. The air system according to claim 3, the dehumidifying member is covered by a protective cover with porosity.

8. The air system according to claim 4, the dehumidifying member is covered by a protective cover with porosity.

\* \* \* \* \*